May 7, 1963
L. TROY
3,088,568
LOADING RAMP OR SKID FOR VEHICLES
Filed Nov. 30, 1960
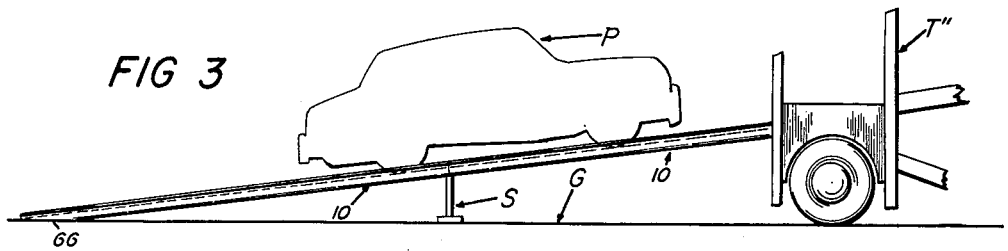
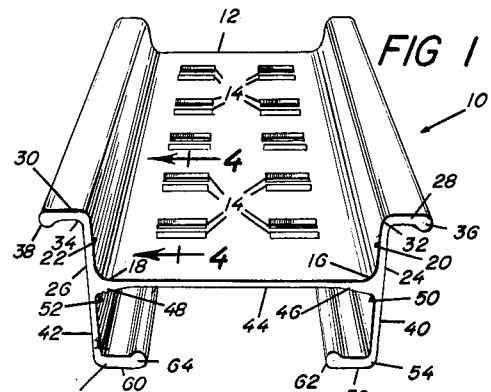
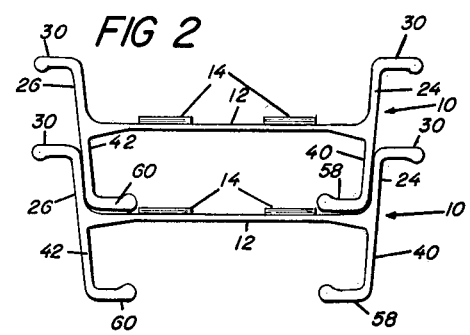
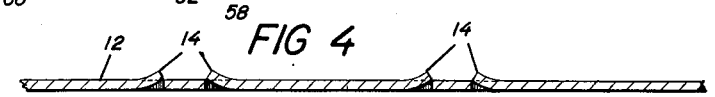
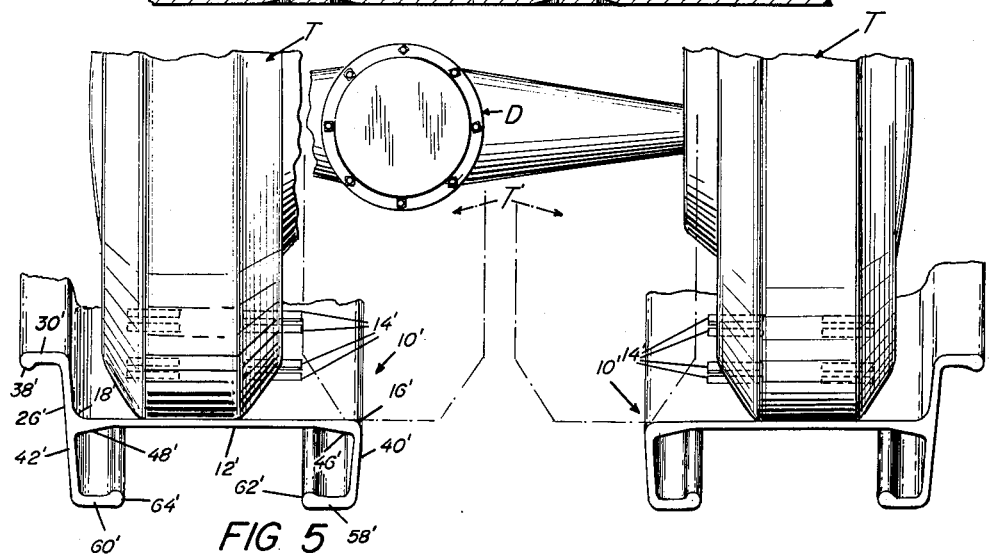
INVENTOR
*Leonard Troy*
by
ATTORNEY United States Patent Office
3,088,568
Patented May 7, 1963

3,088,568
LOADING RAMP OR SKID FOR VEHICLES
Leonard Troy, 5 Pen-y-Bryn Drive, Scranton, Pa.
Filed Nov. 30, 1960, Ser. No. 72,718
9 Claims. (Cl. 193—38)

This invention relates generally to skids or ramps particularly adapted for loading and unloading passenger vehicles, trucks, farm tractors or the like on auto-hauling trailers, freight cars, etc.

Load ramps or skids for loading vehicles should be strong enough to support the loads which they are intended to carry, yet light in weight, offer a minimum of interference with the chassis of a vehicle moved thereover, provide guide means for the wheels of the vehicle, and be readily stored.

Due to the lowering of chassis-to-road clearance of passenger vehicles in order to attain interior passenger-foot space and to attain a lower center of gravity, conventional loading ramps or skids have generally comprised an upwardly opening channel member which for purposes of strength may be satisfactory yet failed to provide versatility of use for loading different types of vehicles. The conventional channel-member type loading ramps or skids have been found to require a relatively deep section including excessively high side webs in order to afford the required strength for the maximum load to be carried, this causing an increase in weight, interference with the chassis of passenger vehicles and not being adaptable for storage and/or shipping.

The primary objects of the invention are to provide a novel loading ramp or skid construction affording versatility for use with different vehicles and providing a maximum of strength and a minimum of vehicle-chassis interference, yet positively guiding the wheels of a vehicle during loading and unloading, and further providing a structure which may be readily stored, shipped, and produced by welding or extrusion.

Other objects and the nature and advantages of the instant invention will become apparent from the following description taken in conjunction with the accompanying drawings, wherein, In the drawings:

FIG. 1 is an isometric view of one embodiment of the novel loading ramp or skid;

FIG. 2 is a vertical elevation illustrating the manner in which the novel loading ramps or skids may be nested for transport on an auto haul-away vehicle when transported;

FIG. 3 is a side elevation, essentially diagrammatic, showing the manner in which the loading ramps or skids of the invention are used to load a passenger vehicle on the rear portion of an auto haul-away trailer;

FIG. 4 is an enlarged fragmentary section taken substantially on line 4—4 of FIG. 1, showing how integral traction increasing means are formed on the loading ramp or skid; and FIG. 5 is a vertical elevation showing another embodiment of the novel loading ramp or skid, which reduced the weight of the ramp or skid and shows by phantom lines how it accommodates dual-wheeled vehicles thereon.

Referring to the drawings in detail and considering FIG. 1, the novel loading ramp or skid comprises an elongated, unitary metal body member 10 which may be readily manufactured by extrusion or welding processes. The body member 10 includes a transverse, horizontal wheel-receiving portion 12 which is substantially planar. The wheel-receiving portion 12 has an open upper surface to facilitate ready movement of vehicle wheels thereover and may include integrally formed, traction increasing lug portions 14 which are struck-out from intermediate portions of the portion 12.

The upper, intermediate surface of the portion 12 is essentially flat and merges at opposite longitudinal inner and outer side margins 16 and 18, respectively, in a thickened radius portion which will merge into the adjacent surface portions 20 and 22, respectively, of vertically extending upper wheel-guide and ramp reinforcing webs 24 and 26. The webs 24 and 26 diverge from the upper surface of the portion 12 to facilitate nesting as illustrated in FIG. 2. Each of the webs 24 and 26 includes at the upper edges thereof, outwardly extending thickened flanges 28 and 30, respectively, and the intersection therebetween includes a radius portion 32 and 34, respectively, to aid in the transmittal of internal stresses. The flanges 28 and 30 respectively include marginal reinforcing beads 36 and 38 which reinforce the member along its entire length.

Coplanar with the webs 24 and 26 at the inner and outer marginal sides 16 and 18 of the wheel-receiving portion 12 are lower, depending flanges 40 and 42, respectively, which converge beneath the portion 12 to facilitate the previously mentioned nesting shown in FIG. 2. The lower surface 44 of portion 12 includes adjacent the inner and outer side margins, angularly extending reinforcing fillets 46 and 48 which merge at a radius portion 50 and 52 with the inner surface of the webs 40 and 42, respectively. The webs 40 and 42 respectively include at radius portions 54 and 56, inwardly directed, thickened, lateral flanges 58 and 60 which terminate in marginal bead portions 62 and 64, respectively.

The wheel-receiving portion 12 together with the webs 40, 42 and flanges 58, 60 form an inverted channel which has the desirable strength requirements and resistance to bending about the longitudinal axis of the ramp or skid 10, but which will in no way cause interference with a vehicle chassis, or movement of a wheel.

The webs 24, 26 will aid to reinforce the ramp, but will also function as means to guide vehicle wheels onto the ramp to provide a clear path of travel for the wheels, facilitating nesting, and can be maintained low enough, due to the strength afforded by portion 12 and webs 40, 42 and flanges 58, 60, to provide ample clearance with the vehicle chassis. Additionally, the webs 24, 26 will be maintained low enough to prevent damage to side walls of tires, especially white side walls.

It will be noted in FIG. 2 the manner in which the converging webs 40, 42 of an upper ramp are readily received in the upper diverging webs 24, 26 of an underlying ramp.

Considering FIG. 3, the end portion of an auto haul-away vehicle is indicated generally at T and will have parallel pairs of longitudinally aligned skid or ramp members 10 suitably supported thereon. The members 10 are intermediately supported by a suitable support stand S and the ramps 10 may be tapered at one end 66 to conform with a support surface G. The vehicle P may be readily driven up or down the loading ramps or skids 10 without interference from the upper webs of the ramps.

The embodiment of FIG. 5 discloses a pair of novel load ramps or skids indicated generally at 10' and which will be used in the manner described above relative to FIG. 3.

Primed reference characters of similar previously described structure are used in the description of the ramps 10' of FIG. 5. The differential portion of a vehicle is indicated generally at D and has operatively connected thereto tires T. Indicated generally at T' by phantom lines are dual tires which would extend over the inner margins of the ramps 10'. In this embodiment all of the advantages mentioned above relative to FIGS. 1 and 2 would be afforded with the additional function of handling dual-wheeled vehicles.

The ramps 10' include a wheel receiving portion 12' including at one marginal side 18' a vertical web 26' which includes an outwardly extending flange 30' having a marginal bead 38'. Depending from the margin 18' is a web 42' coplanar with web 26' and terminating in an inwardly extending marginal flange 60' having a marginal bead 64'. Radius portions 34' and 56' are provided between webs and flanges 26', 30' and 42', 60'. A reinforcing fillet 48' is provided between portion 12 and web 42'.

At the inner marginal side 16' there is included a depending web 40', a fillet 46', and the web 40' includes an inwardly extending flange 58' terminating in a marginal bead 62'. The structure of the embodiment of FIG. 5 is substantially the same as that of FIG. 8 except the web 24 has been removed for the purpose mentioned above.

Thus there has been disclosed a vehicle ramp or skid which affords the best possible combination of light weight, low cost of manufacture, strength, clearances between the loading ramp and vehicle chassis, guidance for tires without injury to sidewalls, stiffness and efficient storage during transport.

It will be obvious to those skilled in the art that various changes may be made without departing from the spirit of the invention and therefore the invention is not limited to what is shown in the drawings or described in the specification, but only as indicated in the appended claims.

What is claimed is:

1. A skid or ramp for use in supporting a vehicle when moving the vehicle between different elevations comprising an elongated unitary extruded member functioning as a beam and wheel guide means, said unitary member including a transverse, substantially planar, horizontal, wheel-receiving portion for receiving a vehicle wheel thereon, said wheel-receiving portion including opposed inner and outer side margins, a pair of lower webs extending the length of said member and depending from said side margins, said lower webs including lower marginal and laterally-extending flanges along the length of said webs and in spaced parallel relation to said wheel-receiving portion for reinforcing said member against bending about its longitudinal axis, at least one upper web extending the length of said member and vertically from one of said side margins and coplanar with the lower web depending from said one side margin, said upper web terminating in an outwardly extending flange along the length thereof for permitting the entire wheel-receiving portion to be exposed, said upper web functioning to guide a wheel onto said planar, horizontal, wheel-receiving portion and aiding to prevent bending of said member about its longitudinal axis, said laterally extending flanges on said lower webs being directed inwardly beneath and below said wheel-receiving portion, said lower webs converging inwardly in angular relation to and beneath said wheel receiving portion to permit a plurality of said members to be nested.

2. A skid or ramp as set forth in claim 1 wherein said laterally extending flanges terminate in an enlarged marginal bead portion reinforcing said flanges along their entire length.

3. A skid or ramp as set forth in claim 1 wherein said wheel receiving portion includes reinforcing fillet portions extending downwardly and angularly from the lower end surface of said wheel-receiving portion merging into said depending webs in a radius portion, the upper surface of said wheel-receiving portion merging into the adjacent surface of said upper web in a radius portion, each of the external edges of said ramp member including radius portions to equalize and distribute internal stresses on said member when it is loaded.

4. A skid or ramp as set forth in claim 1 wherein a second upper web extends the length of said member and vertically from said other side margin and coplanar with the other lower web depending therebeneath, said second upper web terminating in an outwardly extending flange along the length thereof.

5. A skid or ramp for use in supporting a vehicle when moving the vehicle between different elevations comprising an elongated unitary member functioning as a beam and wheel guide means, said unitary member including a transverse, substantially planar, horizontal, wheel-receiving portion for receiving a vehicle wheel thereon, said wheel-receiving portion including opposed inner and outer side margins, a pair of lower webs extending the length of said member and depending from said side margins, said lower webs including lower marginal and laterally-extending flanges along the length of said webs for reinforcing said member against bending about its longitudinal axis, an upper web extending the length of said member and vertically from one of said side margins and coplanar with the lower web depending from said side margin, said upper web terminating in an outwardly extending flange along the length thereof for permitting the entire wheel-receiving portion to be exposed, said upper web functioning to guide a wheel onto said planar, horizontal, wheel-receiving portion and aiding to prevent bending of said member about its longitudinal axis, and a second upper web extending the length of said member and vertically from said other side margin and coplanar with the other lower web depending therebeneath, said second upper web terminating in an outwardly extending flange along the length thereof, said laterally extending flanges on said lower webs being directed inwardly beneath and below said wheel-receiving portion.

6. A skid or ramp for use in supporting a vehicle when moving the vehicle between different elevations comprising an elongated unitary member functioning as a beam and wheel guide means, said unitary member including a transverse, substantially planar, horizontal, wheel-receiving portion for receiving a vehicle wheel thereon, said wheel-receiving portion including opposed inner and outer side margins, a pair of lower webs extending the length of said member and depending from said side margins, said lower webs including lower marginal and laterally-extending flanges along the length of said webs for reinforcing said member against bending about its longitudinal axis, an upper web extending the length of said member and vertically from one of said side margins and coplanar with the lower web depending from said side margin, said upper web terminating in an outwardly extending flange along the length thereof for permitting the entire wheel-receiving portion to be exposed, said upper web functioning to guide a wheel onto said planar, horizontal, wheel-receiving portion and aiding to prevent bending of said member about its longitudinal axis, and a second upper web extending the length of said member and vertically from said other side margin and coplanar with the other lower web depending therebeneath, said second upper web terminating in an outwardly extending flange along the length thereof, said wheel-receiving portion including integral, upwardly extending traction-increasing portions formed from intermediate, upwardly displaced portions of said wheel-receiving portion.

7. A skid or ramp for use in supporting a vehicle when moving the vehicle between different elevations comprising an elongated unitary member functioning as a beam and wheel guide means, said unitary member including a transverse, substantially planar, horizontal, wheel-receiving portion for receiving a vehicle wheel thereon, said wheel-receiving portion including opposed inner and outer side margins, a pair of lower webs extending the length of said member and depending from said side margins, said lower webs including lower marginal and laterally-extending flanges along the length of said webs for reinforcing said member against bending about its longitudinal axis, an upper web extending the length of said member and vertically from one of said side margins and coplanar with the lower web depending from said side margin, said upper web terminating in an outwardly extending flange along the length thereof for permitting the entire wheel-receiving portion to be exposed, said upper web functioning to guide a wheel onto said planar, horizontal, wheel-receving portion and aiding to prevent bending of said member about its longitudinal axis, and a second upper web extending the length of said member and vertically from said other side margin and coplanar with the other lower web depending therebeneath, said second upper web terminating in an outwardly extending flange along the length thereof, said laterally extending flanges on said lower webs being directed inwardly beneath and below said wheel-receiving portion, said lower webs converging inwardly beneath said wheel-receiving portion to permit said members to be nested within an underlying ramp member.

8. A skid or ramp for use in supporting a vehicle when moving the vehicle between different elevations comprising an elongated unitary member functioning as a beam and wheel guide means, said unitary member including a transverse, substantially planar, horizontal, wheel-receiving portion for receiving a vehicle wheel thereon, said wheel-receiving portion including opposed inner and outer side margins, a pair of lower webs extending the length of said member and depending from said side margins, said lower webs including lower marginal and laterally-extending flanges along the length of said webs for reinforcing said member against bending about its longitudinal axis, an upper web extending the length of said member and vertically from one of said side margins and coplanar with the lower web depending from said side margin, said upper web terminating in an outwardly extending flange along the length thereof for permitting the entire wheel-receiving portion to be exposed, said upper web functioning to guide a wheel onto said planar, horizontal, wheel-receiving portion and aiding to prevent bending of said member about its longitudinal axis, and a second upper web extending the length of said member and vertically from said other side margin and coplanar with the other lower web depending therebeneath, said second upper web terminating in an outwardly extending flange along the length thereof, said laterally extending flanges terminating in an enlarged marginal bead portion reinforcing said flanges along their entire length.

9. A skid or ramp for use in supporting a vehicle wheel moving the vehicle between different elevations comprising an elongated unitary member functioning as a beam and wheel guide means, said unitary member including a transverse, substantially planar, horizontal, wheel-receiving portion for receiving a vehicle wheel thereon, said wheel-receiving portion including opposed inner and outer side margins, a pair of lower webs extending the length of said member and depending from said side margins, said lower webs including lower marginal and laterally-extending flanges along the length of said webs for reinforcing said member against bending about its longitudinal axis, an upper web extending the length of said member and vertically from one of said side margins and coplanar with the lower web depending from said side margin, said upper web terminating in an outwardly extending flange along the length thereof for permitting the entire wheel-receiving portion to be exposed, said upper web functioning to guide a wheel onto said planar, horizontal, wheel-receiving portion and aiding to prevent bending of said member about its longitudinal axis, and a second upper web extending the length of said member and vertically from said other side margin and coplanar with the other lower web depending therebeneath, said second upper web terminating in an outwardly extending flange along the length thereof, said wheel receiving portion including reinforcing fillet portions extending downwardly and angularly from the lower end surface of said wheel-receiving portion merging into said depending webs in a radius portion, the upper surface of said wheel-receiving portion merging into the adjacent surface of said upper web in a radius portion, each of the external edges of said ramp member including radius portions to equalize and distribute internal stresses on said member when it is loaded.

References Cited in the file of this patent

UNITED STATES PATENTS

| | | |
|---|---|---|
| 2,266,543 | Francis | Dec. 16, 1941 |
| 2,516,407 | Mullen | July 25, 1950 |
| 2,836,277 | Stuart | May 27, 1958 |

FOREIGN PATENTS

| | | |
|---|---|---|
| 548,509 | Canada | Nov. 5, 1957 |